United States Patent [19]
Du Pasquier et al.

[11] Patent Number: 6,150,051
[45] Date of Patent: Nov. 21, 2000

[54] THERMAL SWITCH FOR USE IN PLASTIC BATTERIES

[75] Inventors: Aurelien Du Pasquier; Jean-Marie Tarascon, both of Amiens, France

[73] Assignee: Telcordia Technologies, Inc., Morristown, N.J.

[21] Appl. No.: 09/032,558

[22] Filed: Feb. 27, 1998

[51] Int. Cl.[7] .................................................. H01M 2/34
[52] U.S. Cl. ............................................. 429/62; 429/235
[58] Field of Search ........................................ 429/62, 235

[56] References Cited

U.S. PATENT DOCUMENTS

| | | | |
|---|---|---|---|
| 4,603,165 | 7/1986 | McDonald et al. | 524/440 |
| 4,973,532 | 11/1990 | Taskier et al. | 429/62 |
| 5,565,281 | 10/1996 | Yu et al. | 429/62 |

*Primary Examiner*—Maria Nuzzolillo
*Assistant Examiner*—Mark Ruthkosky
*Attorney, Agent, or Firm*—David A. Hey

[57] ABSTRACT

The present invention relates to large plastic batteries having thermal switches to protect against overheating of the battery. In particular the present invention provides a rechargeable battery comprising a positive electrode, a negative electrode, an electrically conductive collector associated with each electrode, a separator element arranged between the electrodes and a thermal switch layer containing a thermally-sensitive composition effective arranged to allow disruption of electrical conduction when the battery temperature reaches a critical temperature. Further the present invention provides a rechargeable battery comprising a positive electrode, a negative electrode, an electrically conductive collector associated with one electrode, a separator element arranged between the electrodes, and at least one thermal switch layer containing a thermally-sensitive composition associated with the other electrode.

14 Claims, 2 Drawing Sheets

THERMAL SWITCH FOR USE IN PLASTIC BATTERIES

FIELD OF THE INVENTION

The present invention relates to plastic batteries containing thermal switches which prevent the flow of current between the electrodes of the plastic battery when the cell temperature gets too high for safe use. In addition, the thermal switch protects the plastic battery from damage due to excessive temperature generated during use of the battery cell. The present invention is particularly useful for plastic batteries having powers greater than 100 Watt hours (Wh).

BACKGROUND OF THE INVENTION

Plastic batteries of the present invention are electrolytic cells comprising polymeric composition electrode and electrolyte members, and are described for example in prior U.S. Pat. Nos. 5,196,279 and 5,296,318 both of which are incorporated by reference in their entirety. The development of plastic batteries has improved the properties of rechargeable batteries and has expanded the applications for which batteries can function effectively.

Relatively small plastic batteries possess large surface areas and have only limited energy and therefore cell overheating is quite unlikely, even in the event of a short circuit. This is in contrast to similarly small sized liquid lithium ion batteries which normally require a safety mechanism, generally in the form of a positive temperature coefficient ("PTC") switch which places the cell into an open-circuit condition when the cell temperature exceeds a predetermined temperature, usually in the range of 100° C. An example of a PTC resistor for a liquid lithium ion battery is described in U.S. Pat. No. 5,376,467. Larger plastic batteries, especially those having powers greater than 100 Wh may exhibit cell overheating similar to that experienced in liquid lithium ion batteries and therefore require safety features which act to open the battery circuit in the event of cell overheating or in the event of local short-circuit.

SUMMARY OF THE INVENTION

In accordance with the present invention, large plastic batteries are provided with a sensing device which acts to open the battery circuit in the event of excessive temperatures; e.g. exceeding about 100° C., or in the event of a local short-circuit. The sensing device may be external to the battery; i.e. a PTC switch provided on each cell, or may be incorporated as a component of the plastic cell of the battery. In a particular embodiment of the present invention, the sensing device comprises a PTC switch integrated into one of the active electrodes of the battery.

To achieve the foregoing advantages and in accordance with the purpose of the invention, as embodied and broadly described herein, the present invention provides a rechargeable battery comprising a positive electrode, a negative electrode, an electrically conductive collector associated with each electrode, a separator element arranged between the electrodes and a thermal switch layer containing a thermally-sensitive composition effective arranged to allow disruption of electrical conduction when the battery temperature reaches a critical temperature.

The present invention further provides a rechargeable battery comprising a positive electrode, a negative electrode, an electrically conductive collector associated with one electrode, a separator element arranged between the electrodes, and at least one thermal switch layer containing a thermally-sensitive composition associated with the other electrode.

Further advantages of the invention will be apparent to those skilled in the art from the following description or from practice of the invention.

DESCRIPTION OF THE INVENTION

Figure 1:
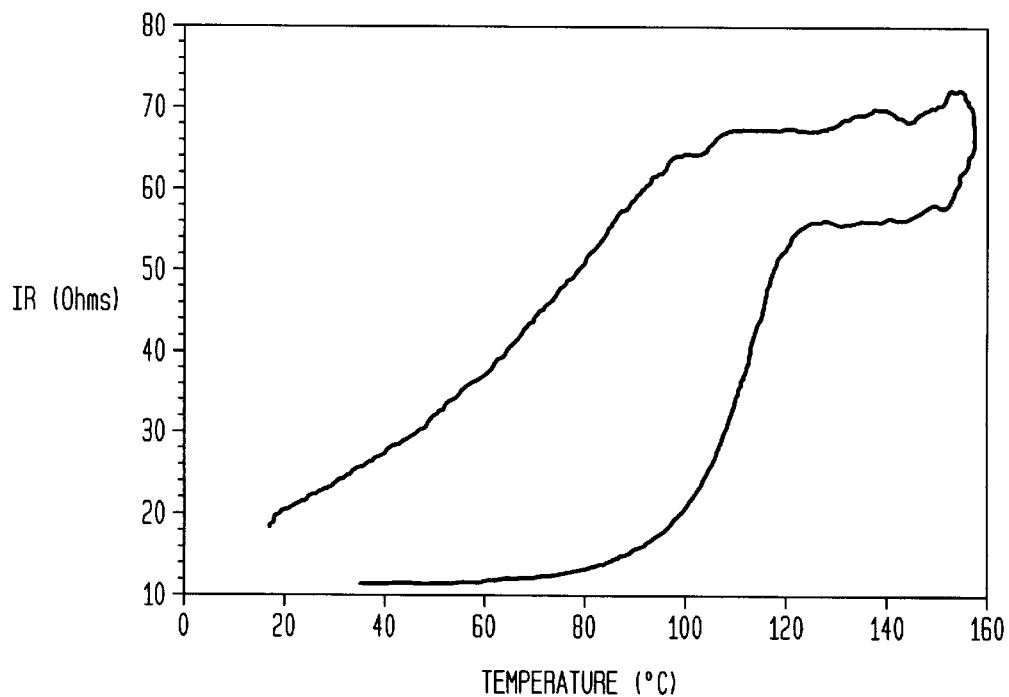
FIG. 1 is a graph showing the PTC effect for a thermal switch in accordance with one embodiment of the present invention.

The present invention is directed to the incorporation of a thermal switch into the structure of a plastic battery. The thermal switch provides protection to the battery by electronically disconnecting the positive electrode from the negative electrode in the event that the battery cell reaches a predetermined unsafe temperature; e.g. about 100° C.

The plastic batteries of the present invention are preferably secondary lithium ion batteries having in general a positive electrode, a negative electrode, a separator and a thermal switch. Preferably, the plastic batteries of the present invention are those in which each of the electrodes, separator and thermal switch are formed of flexible polymeric compositions. These plastic batteries may be manufactured by any well known process, including lamination of the various elements together or successive coating of layers to form the composite battery structure.

In accordance with the present invention the thermal switch produces a sharp change in electronic conductivity which is effective to disrupt electrical conduction between the electrodes of the battery. In particular, the thermal switch may comprise an inorganic compound embedded in a polymeric matrix, the inorganic compound having an insulator to metal transition with decreasing temperature, e.g. a large increase in resistivity around 120° C. Alternatively, the sharp changes in electronic conductivity can be achieved by embedding an inorganic material or a metallic powders in a polymeric matrix, the polymer matrix having a melting temperature in the range of 100° C. to 120° C. and exhibiting large volume changes at the melting temperature.

Flexible polymeric compositions which may be used for the solid state portion of either electrode, the separator membrane and/or the switch layer may be selected from, for example, copolymers of vinylidene fluoride (VdF) and hexafluoropropylene (HFP), PVC, PAN and the like. More particularly, the polymer may be selected from polymers and copolymers of vinyl chloride, vinyl chloride and vinylidene chloride, vinyl chloride and acrylonitrile, acrylonitrile, vinylidene fluoride, vinylidene fluoride with hexafluoropropylene, vinylidene fluoride with hexafluoropropylene and a member of the group consisting of vinyl fluoride, tetrafluoroethylene, an trifluoroethylene.

During formation of the polymer membrane of the battery, it is desirable to incorporate a plasticizer into the polymer matrix. The plasticizer will later be substantially removed and replaced with an electrolytic salt. The plasticizer should be at least partially compatible with the polymer matrix to allow for control of melting during the battery formation, and should have a very low vapor pressure to prevent evaporation during handling and storage. The main role of the plasticizer is to impart solvent-presence memory by inducing the formation of a looser, less entangled, and less crystalline structure. In addition, the plasticizer allows the polymeric material to exhibit enhanced swelling when contacted with a liquid electrolyte solution, preferably following the extraction of at least a portion of the plasticizer.

Plasticizers for use in the present invention include, for example, dibutyl phthalate, dimethyl phthalate, diethyl phthalate, tributoxyethyl phosphate, propylene carbonate, ethylene carbonate, trimethyl trimellitate, mixtures of these, and the like.

Inorganic fillers, such as fumed silica or silanized fumed silica may also be incorporated into the polymeric material making up the solid state components of the battery, i.e., both electrodes and separator membrane. These fillers enhance the physical strength and melt viscosity of the component and, in some compositions, increase the subsequent level of electrolyte solution absorption.

Active materials for inclusion in the positive electrode include $Li_xMn_2O_4$, $LiCoO_2$ and $LiNiO_2$.

Active materials for inclusion in the negative electrode include petroleum coke, microbead carbon coke, synthetic graphite, natural graphite, synthetic graphitized carbon fibers and synthetic graphitized carbon whiskers. Active materials for use in the negative electrode may further include oxides of tungsten, oxides of molybdenum, chalcogenides of titanium or chalcogenides of molybdenum.

The secondary lithium ion batteries of the present invention generally comprise the following elements and can be formed in the following manner. A terminal layer of aluminum grid may be coated with, or laminated to, an intercalation electrode composition, e.g., a $LiMn_2O_4$ powder in a polymer matrix, to form a positive electrode. A hybrid electrolyte separator layer can then be formed on, or laminated to, the positive electrode from a composition comprising a solution of a copolymer and a plasticizer. A lithium metal electrode and a copper terminal foil or grid making up the negative electrode can then be pressed onto the assembly to complete the cell structure. Alternatively, in a lithium-ion cell, a copper foil coated with carbon, e.g., petroleum coke or graphite, dispersed in a composition of the electrolyte copolymer may be used at the negative electrode in place of the lithium metal and terminal foil. This process lends itself well to a continuous production of battery cells. However, it is preferred that the electrolytic salt not be introduced during the assembly stage because the hygroscopic property thereof imposes extreme limitations on the conditions under which the coating and cell assembly operations are carried out.

Rather than a continuous process, it is preferable to assemble the battery body as described above, wherein the separator membrane and both electrode films are substantially devoid of hygroscopic electrolyte salt. Activation of the battery can then be carried out at a later time as desired. During such final battery activation operation when the condition sensitive electrolyte salt solution is introduced into the battery cell there is a need for maintaining anhydrous conditions, for example an atmosphere of dry, inert gas. When contacted with the assembled battery body the electrolyte salt solution readily migrates through the electrode grid and into the membrane matrix to provide substantially the same conductivity enhancement as can be achieved by a preformed hybrid electrolyte film.

In addition to the standard battery elements described above, the batteries according to the present invention include a thermal switch formed from a thin polymer film containing a preselected amount of a material which will render the film conducting at room temperature, but which disrupts the electrical conductivity of the battery at a predetermined temperature, e.g. exceeding about 100° C.

In another embodiment of the present invention, at least one of the Cu or Al current collector is replaced by a plastic matrix containing a preselected amount of a metallic powder which renders the film conductive. The matrix also contains a thermally sensitive preselected material which acts as the thermal switch and is capable of electronically disconnecting the battery cell. This embodiment has the advantage that it not only solves the thermal switching problem, but also reduces the weight of the current collector and thereby increases the cell capacity.

As stated above, the thermal switch of the present invention produces a sharp change in electronic conductivity which is effective to disrupt electrical conduction between the electrodes of the battery. In a first embodiment, the thermal switch may comprise an inorganic compound embedded in a polymeric matrix, the inorganic compound having an insulator to metal transition with decreasing temperature, e.g. a large increase in resistivity around 120° C. When used in the battery according to the present invention, upon battery temperature reaching the insulator to metal transition temperature, the thermal switch will electronically disconnect the battery.

Polymers for use as the polymer matrix of the thermal switch are not limited by the same constraints as those used to form the solid state components of the plastic battery. In particular, the use of a plasticizer is not necessary as long as the polymer forms a good interface with the polymer which is used to form the solid state components. However, the polymer material for the thermal switch must be at least partially compatible with the extraction process described above. i.e. at least a portion of the extractable components e.g. plasticizers in the solid state component polymers, must be accessible to solvent so that the battery can be ultimately activated.

The thermal switch of the present invention may be integrated into one or both of the electrodes or alternatively may be a separate layer within the battery body. When the thermal switch is a separate layer, it may be situated in a number of different locations within the battery body, including, between the negative electrode and its associated current collector layer, between the positive electrode and its associated current collector layer, between the negative electrode and the separator layer, between the positive electrode and the separator layer, or combinations of any of the foregoing. In addition, the thermal switch may be present both as an incorporated with one or both of the electrodes and as a separate layer within the battery body. Other locations for the thermal switch layer and combinations of incorporated and separate thermal switch layers may be used without departing from the concept of the present invention as will be apparent to one skilled in the art, especially with regard to the examples below.

In one embodiment the inorganic compound may be prepared as a finely divided powder using a sol-gel process and the powder may then be dispersed in the polymer matrix of the separate thermal switch layer or either of the positive or negative electrodes in a concentration beyond the percolation limit value of 20%. The term "percolation limit" means the concentration at which the conducting particles form a conducting path through the insulating polymer matrix and render the entire film conducting.

In standard lithium ion technology, the voltage of the positive electrode can reach up to 5 V. For this reason, when incorporating the thermal switch into the positive electrode, the inorganic compounds for the thermal switch are preferably selected from among the oxide family. In addition, finely divided metallic powders can provide the appropriate percolation limit. However, because of the large oxidation voltage at the positive electrode (e.g. 5V), with the possible exception of Al powders, such metallic powders should are not generally appropriate for use at the positive, as the metallic powders would be rapidly oxidized and create side reactions within the battery. Al powders may be unsuitable as well because of their rapid passivation in air-contact forming an insulating coating of $Al_2O_3$. Therefore, the use of metallic oxides is preferred.

Unlike the positive electrode, the material of the negative electrode does not usually exceed 3 V, thus a larger variety of inorganic materials including metallic powders can be incorporated into the polymeric matrix to provide the conductivity of the electrode and the thermal switch capabilities of the present invention.

According to this first embodiment the inorganic material for the thermal switch according to the present invention has an insulator to metal transition with decreasing temperature such that there is a large increase in resistivity around 120° C. One metallic oxide material which exhibits such an insulator to metal transition is $V_{1-x}Cr_xO_3$. In a preferred embodiment, the inorganic material for the thermal switch is $V_{1-x}Cr_2O_3$.

According to another embodiment of the present invention, disruption of the electrical conduction between the electrodes is accomplished by providing a thermal switch comprising an inorganic material embedded in a polymeric matrix having a melting temperature in the range of 100° C. to 120° C., and exhibiting large volume changes at the melting temperature. The inorganic material should be present in a concentration at or just slightly above the percolation limit. Then upon battery temperature exceeding the melting temperature of the polymer matrix and the large volume change occurring, the concentration of inorganic materials within the polymer matrix will fall below the percolation limit and effectively disrupt electrical conductivity.

Polymers which can be used for the polymer matrix are essentially the same as those described above as being appropriate for the solid-state components, e.g. copolymers (VdF) and (HFP), PVC, PAN, etc. This is especially true when the thermal switch is incorporated into either of the electrodes. When the thermal switch is present as a separate layer in the battery, there is a wider range of polymers which can be used. As previously noted, the polymer for the thermal switch must form a good interface with the solid-state components and must be partially compatible with the extraction process. Additional polymers for use as a separate thermal switch layer include copolymers of PVDF and HFP as well as PE and PP.

The inorganic material for embedding in the polymer matrix include $V_{1-x}Cr_xO_3$ and the metallic powders noted above. In addition, other metallic oxides such as $MgIn_2O_4$ and YBaCuO and finely divided particles such as carbon, Cu or Al may be used.

By appropriate choice of a polymer and inorganic material, it will be possible to construct tailor made thermal switches which operate at specifically chosen and predetermined temperatures, thus providing greater applicability of the present invention.

The following examples are not to be construed as limiting the invention as described herein.

EXAMPLES

Example 1

Fabrication of a thermal switch based on the melting temperature of the polymeric matrix.

2 g of Super P carbon black (SP) are intimately mixed with 7 gr. of 2801 KYNAR FLEX™ PVDF-HFP copolymer and 1 gr. of DBP (di-butyl phtalate). 20 ml or acetone are added to that powder, and the resulting paste is stirred (either mechanically or magnetically) until a homogeneous slurry is formed (e.g. after half an hour). This slurry is casted using a 10 mils gap opening. The resulting plastic laminate provides a sharp reversible PTC effect with a resistivity increase of one order of magnitude located near 100° C. (see FIG. 1).

Example 2

Thermal switch incorporated in a Li-ion battery.

Figure 2:
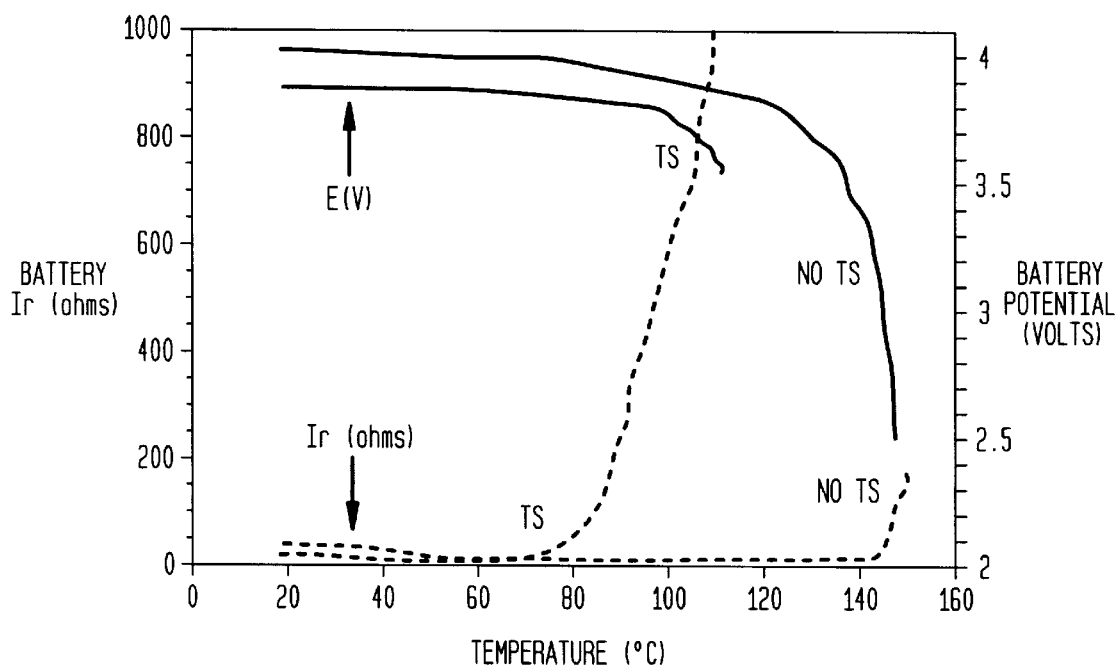
FIG. 2 is a graph showing the changes internal resistance and standby potential with respect to temperature for a battery having a thermal switch in accordance with one embodiment of the present invention and for a battery without a thermal switch.

A plastic film of example 1 is laminated at 165° C. onto an Al grid. This device will serve as current collector for a positive electrode made of a film containing 65 wt. % $Li_{1.05}Mn_{1.95}O_4$. The positive electrode is made by mixing 6.5 g of $Li_{1.05}Mn_{1.95}O_4$, 650 mg of SP carbon, 1 g of 2801 KYNAR FLEX™ PVDF-HFP copolymer and 1.85 g of DBP. 15 ml of acetone is added to that powder, and the resulting paste is stirred (either mechanically or magnetically) until a homogeneous slurry is formed (e.g. after half an hour). This slurry is casted using a 25 mils gap opening. The negative electrode is made by mixing 6.5 g of MC-MB 25–28 graphite, 325 mg of SP carbon, 1 g of 2801 KYNAR FLEX™ PVDF-HFP copolymer and 2.175 g of DBP. 10 ml or acetone are added to that powder, and the resulting paste is stirred (either mechanically or magnetically) until a homogeneous slurry is formed (e.g. after half an hour). This slurry is casted using a 12 mils gap opening. The separator is made by mixing 2 g of $SiO_2$, 4 g of DBP and 3 g of 2810 KYNAR FLEX™ PVDF-HFP copolymer. 10 ml or acetone are added to that powder, and the resulting paste is stirred (either mechanically or magnetically) until a homogeneous slurry is formed (e.g. after half an hour). This slurry is casted using a 12 mils gap opening. The battery is assembled by laminating at 165° C. the positive electrode on the PTC device of the AL grid, the negative electrode on the Cu grid, and finally laminating both electrodes on the separator. The DBP contained in the battery is then extracted by placing the battery in a bath of diethyl ether for five minutes. This operation is repeated three times. Then the battery is dried at 50° C. under vacuum and placed in an argon atmosphere for activation. The battery is swollen by an electrolyte consisting, for example, of a one molar LiPF6 solution dissolved in a EC-DMC (2:1 v:v) mixture, and sealed in a plastic bag. Thus the thermal switch containing battery is ready for use, and once charged, its internal resistance increases sharply beyond 80° C. and its standby potential decreases sharply beyond 100° C., indicating the disconnection of the positive electrode from the current collector. The superimposition of the same experiment carried out on a battery without the thermal switch shows clearly the effect of this device (See FIG. 2).

Example 3

Thermal switch based on the insulator-metal transition.

10 g of the insulator-metal oxide ($V_{1-x}Cr_xO_3$) are mixed with 3 g of 2801 KYNAR FLEX™ PVDF-HFP copolymer, and placed onto a container to which 23 ml of acetone is added. After mixing for 15 minutes, the resulting viscous liquid is casted using a 15 mils gap opening. The resulting plastic laminate denoted "TS" below, can then be placed at various locations within the battery structure.

(1) Cu/TS/negative/Li salt/Positive/Al
(2) Cu/negative/Li salt/Positive/TS/Al
(3) Cu/negative/TS/Li salt/Positive/Al
(4) Cu/negative/Li salt/TS/Positive/Al Note that within the battery structure, the plastic film can play the dual role of current collector and thermal switch by replacing the heavy Cu or Al grid with the plastic PVDF-$V_{1-x}Cr_xO_3$ laminate. In addition, combinations of dual role layers an separate thermal switch layers may be used.

(5) TS/negative/Li salt/Positive/Al
(6) Cu/negative/Li salt/Positive/TS
(7) TS/negative/TS/Li salt/Positive/Al
(8) Cu/negative/Li salt/TS/Positive/TS

Example 4

Other thermal switches based on the melting temperature of the plastic matrix.

Figure 3:
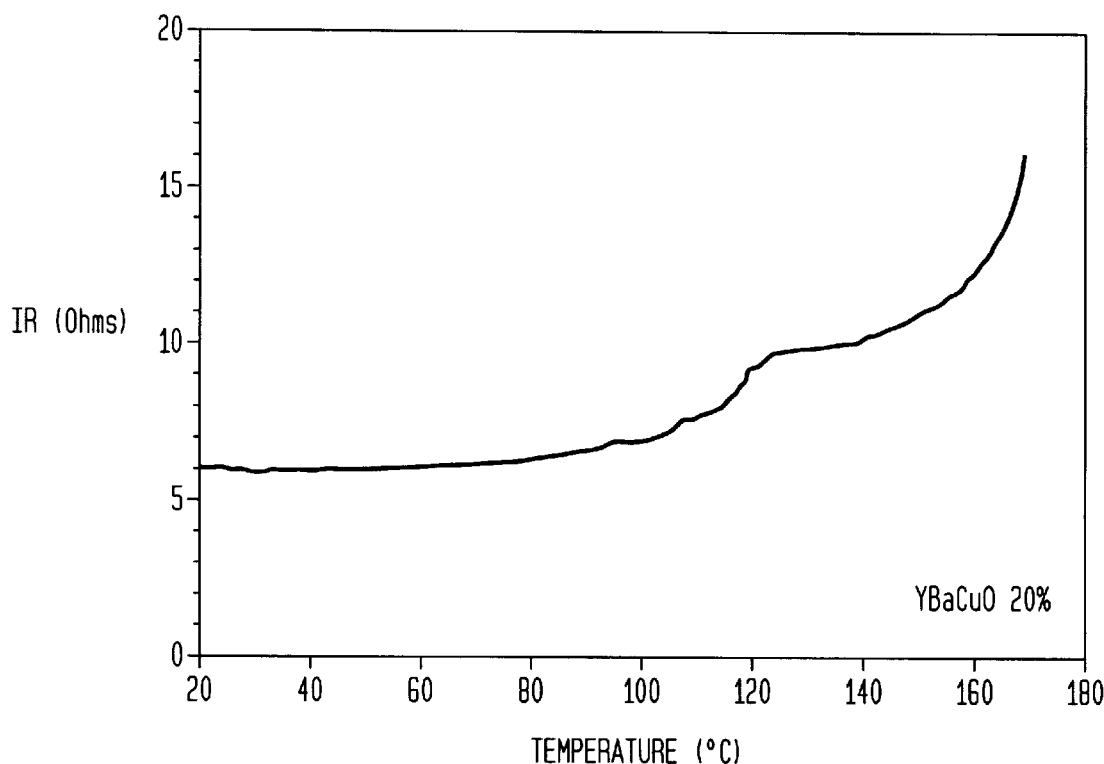
FIG. 3 is a graph showing the PTC effect for a thermal switch in accordance with another embodiment of the present invention.
Figure 4:
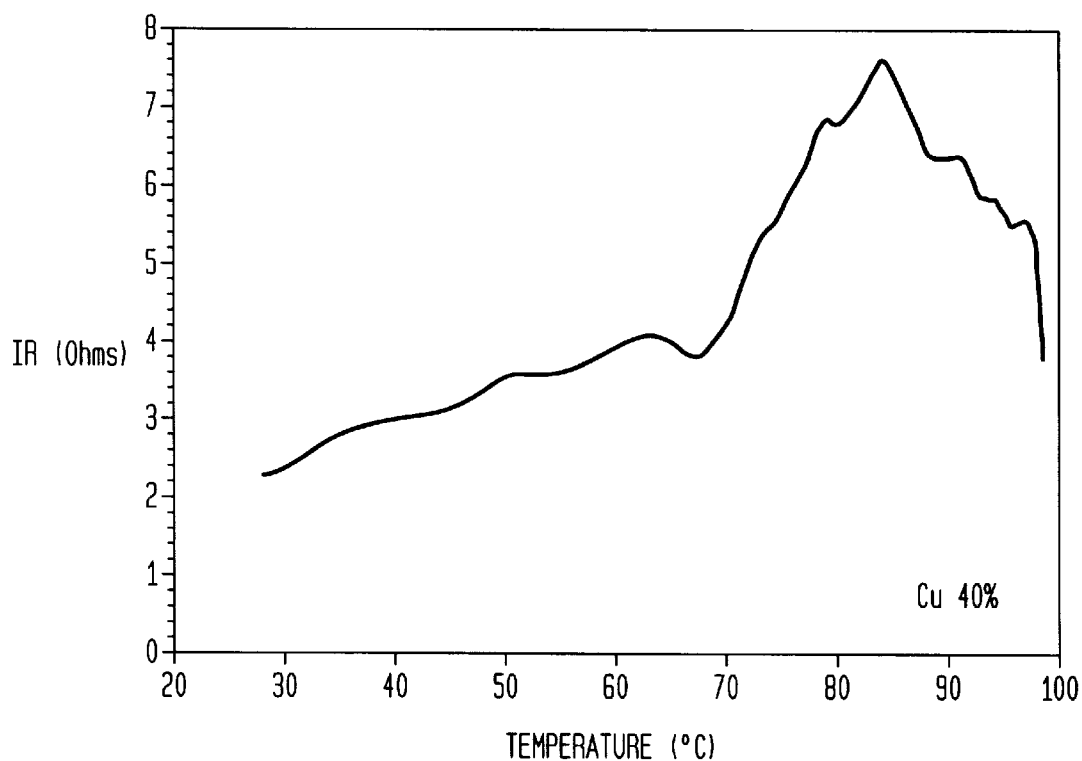
FIG. 4 is a graph showing the PTC effect for a thermal switch in accordance with a further embodiment of the present invention.

Plastic laminates can be made similarly to example 3, by using instead of $V_{1-x}Cr_xO_3$, other metallic oxides, such as the transparent spinel phase $MgIn_2O_4$, the YBaCuO phase (see FIG. 3), carbon or finely divided metal particles, such as Cu (See FIG. 4) or Al. In such cases, it is at the melting temperature of the polymer that the particles will be electrically disconnected, upon the condition that they were present at a concentration corresponding to the percolation limit in the polymeric matrix. Thus the plastic film, denoted "ML" will become non-conducting and can be placed at a variety of locations within the battery.

(9) Cu/ML/negative/Li salt/Positive/Al
(10) Cu/negative/Li salt/Positive/ML/Al
(11) Cu/negative/ML/Li salt/Positive/Al
(12) Cu/negative/Li salt/ML/Positive/Al
(13) ML/negative/Li salt/Positive/Al
(14) Cu/negative/Li salt/Positive/ML
(15) ML/negative/ML/Li salt/Positive/Al
(16) Cu/negative/Li salt/ML/Positive/ML Note the special condition that
if ML is used as the positive electrode, Cu cannot be used because of Cu oxidation
if ML is used as the negative electrode, Al cannot be used because of a reaction with Li.

In addition, is should be noted that the plastic matrix is not limited to PVDF. The use of other polymers such as PE or PP which lead to switches operating a different temperatures so that tailor-made switches (using the right polymer) could be made. It will be apparent that in the examples above, that the melting temperature has to be greater than the insulator-metal transition.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A rechargeable battery comprising:
   a positive electrode,
   a negative electrode,
   an electrically conductive collector associated with each electrode,
   a separator element arranged between the electrodes, and
   at least one thermal switch layer containing a thermally-sensitive composition arranged to allow disruption of electrical conduction when the battery temperature reaches a critical temperature
   wherein said thermally-sensitive composition is $V_{1-x}Cr_xO_3$ wherein $0<x<1$, $MgIn_2O_4$, YBaCuO, or finely divided metal particles of carbon, copper or aluminum.

2. The battery of claim 1, wherein said switch layer comprises a polymeric matrix containing said thermally sensitive composition.

3. The battery of claim 2, wherein said polymeric matrix is a polymer material which changes volume upon the application of heat.

4. The battery of claim 2, wherein said polymeric matrix is a polymer material which will melt at said critical temperature.

5. The battery of claim 2, wherein said thermally-sensitive composition is a material which has an insulator-metal transition point.

6. The battery of claim 5, wherein said thermally-sensitive composition comprises $V_{1-x}Cr_xO_3$ wherein $0<x<1$.

7. The battery of claim 1, wherein said switch layer is located at at least one position selected from between said negative electrode and said conductive collector associated with said negative electrode, between said positive electrode and said conductive collector associated with said positive electrode, between said negative electrode and said separator element, between said positive electrode and said separator element, and combinations of any of the foregoing.

8. A rechargeable battery comprising:
   a positive electrode,
   a negative electrode,
   an electrically conductive collector associated with one electrode,
   a separator element arranged between the electrodes, and
   at least one thermal switch layer containing a thermally-sensitive composition associated with the other electrode
   wherein said thermally-sensitive composition is $V_{1-x}Cr_xO_3$ wherein $0<x<1$, $MgIn_2O_4$, YBaCuO, or finely divided metal particles of carbon, copper or aluminum.

9. The battery of claim 8, wherein said switch layer comprises a polymeric matrix containing said thermally sensitive composition.

10. The battery of claim 9, wherein said polymeric matrix is a polymer material which changes volume upon the application of heat.

11. The battery of claim 9, wherein said polymeric matrix is a polymer material which will melt at a critical temperature.

12. The battery of claim 9, wherein said thermally-sensitive composition is a material which has an insulator-metal transition point.

13. The battery of claim 12, wherein said thermally-sensitive composition comprises $V_{1-x}Cr_xO_3$ wherein $0<x<1$.

14. The battery of claim 8, wherein said switch layer is located at at least one position selected from on the outer surface of said negative electrode, on the outer surface of said positive electrode, between said negative electrode and said separator element, between said positive electrode and said separator element, and combinations of any of the foregoing.

* * * * *